(No Model.)
W. V. ESMOND.
CAMERA TRIPOD.
No. 556,966. Patented Mar. 24, 1896.
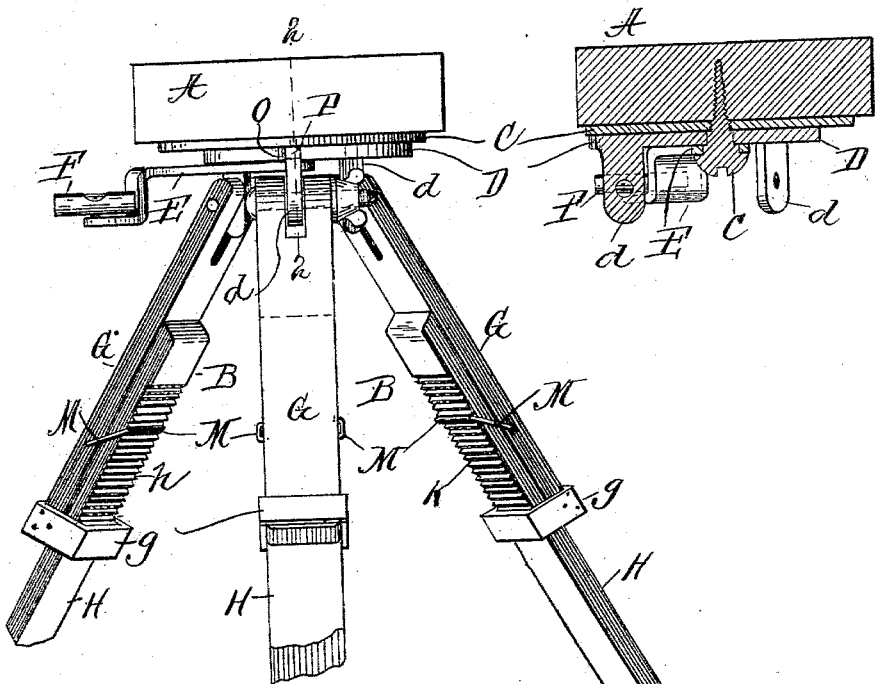
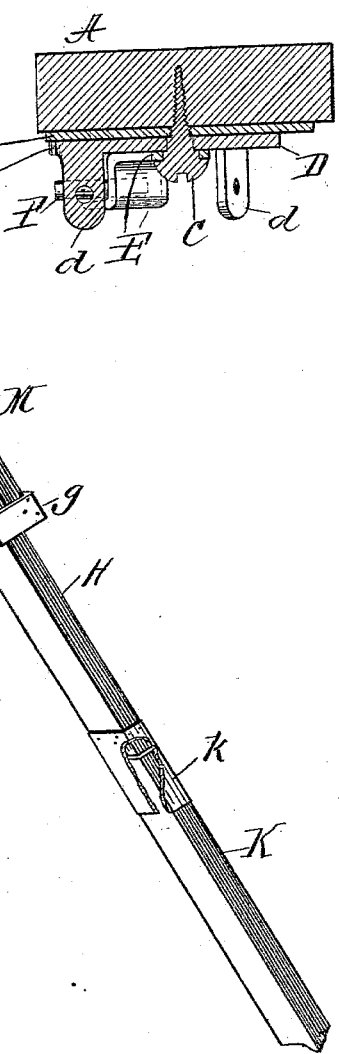
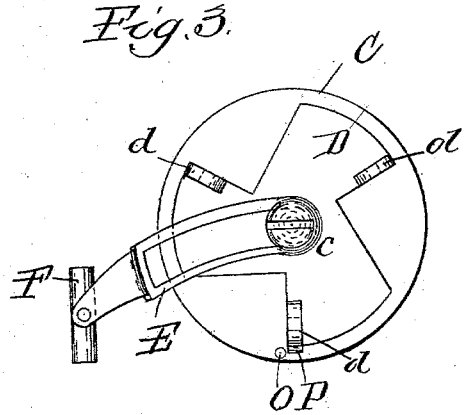
Witnesses
H. R. Grow.
C. H. Crawford.
Inventor
William V. Esmond
By Louis K. Gillson
Attorney.

UNITED STATES PATENT OFFICE.

WILLIAM V. ESMOND, OF CHICAGO, ILLINOIS.

CAMERA-TRIPOD.

SPECIFICATION forming part of Letters Patent No. 556,966, dated March 24, 1896.

Application filed October 5, 1895. Serial No. 564,804. (No model.)

*To all whom it may concern:*

Be it known that I, WILLIAM V. ESMOND, a citizen of the United States, and a resident of Chicago, in the county of Cook and State of Illinois, have invented certain new and useful Improvements in Camera-Tripods, of which the following is a full, clear, and exact description, and which are fully illustrated in the accompanying drawings, which form a part of this specification, and in which—

Figure 1 is an elevation, partly in section, of a tripod. Fig. 2 is a sectional view on the line 2 2 of Fig. 1, and Fig. 3 is a bottom plan of the head of the tripod.

The object of the invention is to facilitate the leveling of the camera; and it consists of a special form of head whereby the tilting of the camera is prevented, while its angular movement is provided for, a swinging level mounted upon an extensible arm, and extensible legs.

Any form of camera may be mounted upon the tripod or stand.

I show at A a section of the bottom of the camera-box. The legs of the camera are indicated at B B. While I refer to the device as a "tripod," the invention is of course equally applicable to a standard having more than three legs. A wear-plate C supports the camera-box and turns upon a plate D, having downwardly-projecting lugs $d$ $d$, to which the legs of the tripod are pivotally attached in any of the well-known methods. The plates C D are secured together by means of a screw $c$, which is in screw-threaded engagement with the plates C, and which may be prolonged to serve as a means of attachment between this plate and the camera-box, as plainly shown in Fig. 2. The body of the screw $c$ is stepped, so that it is provided with a shoulder to bind firmly against the surface of the plate C. This screw serves as a pivot upon which the camera and the plate C are turned over the plate D, and it is provided with an additional shoulder for the engagement of the under surface of the plate D, and upon the portion of its body between its head and the last-named plate there is mounted a longitudinally-slotted arm E, the outer end of which is offset downwardly and carries a small spirit-level F, which is pivoted so as to turn freely in any direction in a plane parallel with that in which the arm E is located and within which it is adapted to slide upon the screw $c$.

Each of the legs of the tripod consists of the three sections G H K. The two lower sections, H K, are united by a simple form of socket-ferrule $k$. The upper section, G, is provided at its lower end with a fixed loop $g$ and above that with a swinging loop M. The upper portion of the inner surface of the central section, H, is serrated, so that when this section is inserted through the loops $g$ M the latter loop, which is of wire, will engage these serrations. This loop is large enough so that when it is in perpendicular relation to the leg it is disengaged from the serration $k$. This form of construction serves as a convenient means of adjusting the length of the leg, so as to level the camera. It will be seen that the swinging movement of the level F provides for leveling the camera in all directions.

A simple form of stop may be provided for limiting the angular movement of the camera-box. I show for this purpose a pin O, depending from the plate C, and a lug P, projecting from the plate D and adapted to strike the pin O. The arm E is preferably curved, as shown, and when the level is not in use it may be thrust in under the head of the tripod. The arm E should be of sufficient length so that the level when withdrawn will not be covered by the camera-box. The area of the plates C D is such that the tilting of the box upon the tripod is positively prevented.

I claim—

1. The combination with the plate, D, having the depending lugs, $d$, of the wear-plate, C, in pivotal engagement with the plate, D, the extensible arm, E, attached to and parallel with the under side of the plate, D, and the level, F, pivoted to the outer end of the arm, E, substantially as described and for the purpose specified.

2. In a camera-stand, the combination with extensible legs, and a head to which the legs are attached, of an arm secured to the head and being extensible in horizontal plane, and a spirit-level pivotally attached to the arm, substantially as described, and for the purpose specified.

3. In a camera-stand, the combination with extensible legs, and a plate, D, for uniting the legs, and having a flat upper surface, of an extensible arm secured to the head, and a spirit-level pivotally attached to the arm, the movements of the arm and of the level being in planes parallel to the upper surface of the plate, D, substantially as described and for the purpose specified.

4. In a camera-stand the combination with extensible legs and a plate, D, to which the legs are pivoted and having a flat upper surface, of a swinging wear-plate for carrying the camera and pivoted to turn upon the surface of the plate, D, an extensible arm, E, and a spirit-level carried by the arm and pivoted to swing in a plane parallel with the surface of the plate, D, substantially as described, and for the purpose specified.

5. The combination with the extensible legs, B, the attaching-plate, D, the swinging plate, C, mounted upon the plate, D, the stepped screw, c, pivotally uniting the two plates, the slotted arm, E, sliding upon the screw, c, and having its outer end offset downwardly, and the spirit-level, F, pivoted upon the offset portion of the arm, all substantially as described, and for the purpose specified.

In testimony whereof I affix my signature in the presence of two witnesses.

WILLIAM V. ESMOND.

Witnesses:
LOUIS K. GILLSON,
SPENCER WARD.